United States Patent
Wamprecht et al.

(12) 
(10) Patent No.: US 6,204,323 B1
(45) Date of Patent: Mar. 20, 2001

(54) AQUEOUS TWO-COMPONENT POLYURETHANE COATING COMPOSITIONS

(75) Inventors: Christian Wamprecht, Neuss; Hans-Josef Laas, Köln, both of (DE)

(73) Assignee: Bayer Aktiengesellschaft, Leverkusen (DE)

( * ) Notice: Subject to any disclaimer, the term of this patent is extended or adjusted under 35 U.S.C. 154(b) by 0 days.

(21) Appl. No.: 09/312,111

(22) Filed: May 14, 1999

(30) Foreign Application Priority Data

May 22, 1998 (DE) ................................ 198 22 890

(51) Int. Cl.[7] ................ C08J 3/00; C08K 3/20; C08L 75/00; B32B 27/00; B32B 27/40
(52) U.S. Cl. ................ 524/591; 428/423.1; 524/839; 524/840
(58) Field of Search ................ 524/591, 839, 524/840; 428/423.1

(56) References Cited

U.S. PATENT DOCUMENTS

| | | | |
|---|---|---|---|
| 4,616,056 | 10/1986 | Chan et al. | 524/392 |
| 5,075,370 | 12/1991 | Kubitza et al. | 524/591 |
| 5,200,489 | 4/1993 | Jacobs et al. | 528/49 |
| 5,252,696 | 10/1993 | Laas et al. | 528/49 |
| 5,331,039 | 7/1994 | Blum et al. | 524/507 |
| 5,336,711 | 8/1994 | Schneider et al. | 524/507 |
| 5,387,642 | 2/1995 | Blum et al. | 524/591 |
| 5,563,207 | 10/1996 | Brahm et al. | 524/591 |
| 5,723,536 | 3/1998 | Baumbach et al. | 524/591 |

FOREIGN PATENT DOCUMENTS

| | | |
|---|---|---|
| 2090144 | 8/1993 | (CA) . |
| 2175530 | 11/1996 | (CA) . |
| 524500 A1 | * 1/1993 | (EP) . |
| 835 889 | 4/1998 | (EP) . |

* cited by examiner

*Primary Examiner*—Patrick D. Niland
(74) *Attorney, Agent, or Firm*—Joseph C. Gil; Thomas W. Roy

(57) ABSTRACT

The present invention relates to a coating composition containing
A) 30 to 99 wt. % of an aqueous hydroxy- and/or amino-functional resin dispersion and
B) 1 to 70 wt. % of a water dispersible polyisocyanate mixture prepared from aliphatic, cycloaliphatic, araliphatic and/or aromatic diisocyanates and having
  a) an average isocyanate functionality of at least 2.0,
  b) a content of 5.0 to 25.0 wt. %, based on resin solids, of isocyanate groups (calculated as NCO; molecular weight=42) and
  c) a content of 2 to 50 wt. %, based on resin solids, of ethylene oxide units calculated as $C_2H_4O$; molecular weight 44) incorporated within polyether chains containing an average of 5 to 35 ethylene oxide units,
wherein at least 60 mole % of the polyether chains are connected via allophanate groups to two polyisocyanate molecules which are each prepared from at least two diisocyanate molecules.

The present invention also relates to the use of these coating compositions for preparing coatings, primers and sealing compositions, in particular for automotive refinish and original equipment manufacture.

15 Claims, No Drawings

AQUEOUS TWO-COMPONENT POLYURETHANE COATING COMPOSITIONS

BACKGROUND OF THE INVENTION

1. Field of the Invention

The present invention relates to new aqueous two-component coating compositions based on hydroxy- and/or amino-functional water dilutable resins and new water dispersible polyisocyanate hardeners and to their use in coating and sealing compositions.

2. Description of the Prior Art

Because of their outstanding properties, two-component polyurethane coating compositions have acquired great importance in the coatings sector. A disadvantage is that in most cases relatively large amounts of organic solvents are required for their processing. However, in almost all fields of use, high-solids and especially water dilutable coating compositions are required to reduce or avoid solvent emissions to the extend possible.

Until a few years ago, it did not seem possible to use water as a solvent for two-component polyurethane coating compositions because isocyanate groups can react not only with the hydroxyl groups of the resin to give urethanes, but also with water to form urea and carbon dioxide. As a result, the processing time, the application reliability and the ability to obtain adequate blister-free coating thicknesses were made difficult, and the resistance properties of the coating compositions and coatings deteriorated to values which no longer met practical requirements.

In recent years efforts have increasingly been made to reduce these problems. EP-A 358,979 discloses that selected polyhydroxy polyacrylate secondary dispersions can be combined with polyisocyanates having free isocyanate groups to give aqueous two-component compositions.

It is also possible to apply this principle to other hydroxy-functional resin dispersions, which means that the properties of the coating compositions can be varied. For example, EP-A 557,844 describes two-component polyurethane coatings based on hydroxy-functional primary dispersions, EP-A 543,228 describes those based on polyester-polyacrylate hybrid dispersions, EP-A 741,176 describes those based on alkyd resins emulsified with foreign components, EP-A 496,205 describes those based on urethane-modified polyester dispersions, and EP 542,105 describes those based on mixtures of various types of resin.

Both hydrophobic and hydrophilic, self-emulsifying polyisocyanates can be used as the polyisocyanate component in the aqueous two-component polyurethane systems. Hydrophilically modified polyisocyanates, such as those described in EP-A 206,059, in EP-A 540,985 and U.S. Pat. No. 5,200,489, are particularly suitable crosslinking agents. Such polyisocyanate mixtures containing polyether-urethanes can be emulsified very easily, e.g., by simple manual stirring, into the aqueous resin dispersion, which is of substantial importance, in particular for automotive refinish car repair and original equipment manufacture. Due to the simplified incorporation of the hardener, a more homogeneous thorough mixing of the components is achieved, and the application reliability and optical properties, especially the gloss of the coatings, are increased significantly.

However, when these polyether-modified polyisocyanates are used, because of the additional hydrophilic groups introduced into the system and the reduced NCO functionality of the crosslinking agent due to the hydrophilic modification, other important properties of the coating composition, in particular the resistance to solvents and water, are impaired. Also, the compatibility of certain dispersions, e.g. primary dispersions (emulsion copolymers), even with the known hydrophilic polyisocyanates, is often not yet adequate, so that cloudy clear varnish films are often obtained. The problems of a limited pot life and the occurrence of reaction blisters in high coating thicknesses also have not yet been satisfactorily solved.

An object of the present invention is to provide new aqueous two-component polyurethane coating compositions with improved resistance to solvents and water combined with a high gloss, reduced haze, prolonged pot life, high application reliability and adequate blister-free coating thicknesses. These new coating compositions should be suitable in particular for automotive refinish and original equipment manufacture, both as a priming filler, filler, top coat and clearcoat.

Surprisingly, it has been possible to achieve this object with the coating compositions according to the invention, which are based on hydroxy- and/or amino-functional water dilutable resins and new water dispersible polyisocyanate hardeners.

The present invention is based on the surprising observation that by reacting low-monomer polyisocyanates with monofunctional polyethylene oxide polyether alcohols to form allophanate groups, it is possible to prepare new water dispersible polyisocyanate mixtures of high isocyanate functionality which can readily be stirred into aqueous compositions considerably more easily and in a more finely divided form at significantly lower polyether contents than prior art water dispersible polyisocyanates which are prepared from the same polyether alcohols with the exception that the polyether chains are connected to the polyisocyanate via urethane groups. Because of their outstanding emulsifiability in water at lower polyether contents in combination with a higher isocyanate functionality, the use of these new polyisocyanate mixtures as the hardener component in aqueous polyurethane coating compositions results in coatings with outstanding optical properties, in particular high surface gloss, flow and high transparency, and also significantly improved water and solvent resistance.

SUMMARY OF THE INVENTION

The present invention relates to a coating composition containing

A) 30 to 99 wt. % of an aqueous hydroxy- and/or amino-functional resin dispersion and
B) 1 to 70 wt. % of a water dispersible polyisocyanate mixture prepared from aliphatic, cycloaliphatic, araliphatic and/or aromatic diisocyanates and having
   a) an average isocyanate functionality of at least 2.0,
   b) a content of 5.0 to 25.0 wt. %, based on resin solids, of isocyanate groups (calculated as NCO; molecular weight=42) and
   c) a content of 2 to 50 wt. %, based on resin solids, of ethylene oxide units calculated as $C_2H_4O$; molecular weight 44) incorporated within polyether chains containing an average of 5 to 35 ethylene oxide units, wherein at least 60 mole % of the polyether chains are connected via allophanate groups to two polyisocyanate molecules which are each prepared from at least two diisocyanate molecules.

The present invention also relates to the use of these coating compositions for preparing coatings, primers and sealing compositions, in particular for automotive refinish and original equipment manufacture.

DETAILED DESCRIPTION OF THE INVENTION

All of the known resin dispersions from aqueous two-component polyurethane coating technology can be employed as component A) in the coating compositions according to the invention. These resin dispersions and the processes for their preparation are known. They include aqueous or water dispersible polyester resins, polyacrylate resins, polyurethane resins, polyurea resins, polycarbonate resins and polyether resins such as those described, for example, in EP-A 358,979, EP-A 469,389, EP-A 496,205, EP-A 557,844, EP-A 583,728, WO 94/03511, WO 94/20559, WO 94/28043 and WO 95/02005. It is also possible to use any desired hybrid dispersions or any desired mixtures of the various dispersions.

Due to property requirements polymer-based resin dispersions are of particular interest in the fields of automotive refinish and original equipment manufacture. Therefore, polyacrylate-based resin dispersions are preferably employed as component A) in the coating compositions according to the invention. Suitable resins include so-called secondary dispersions, in which the resin is first prepared in an organic medium and, after neutralization, the resin is dispersed in water. After dispersion the solvent used for the preparation can either be removed by distillation or remain in the dispersion as a co-solvent. So-called primary dispersions can also serve as resin dispersions. These are generally understood as being emulsion copolymers which are prepared directly in water with the aid of emulsifiers.

Resin dispersions A) can be prepared both by using (adding) external emulsifiers and/or with the aid of internal emulsifiers, i.e., ionic groups chemically incorporated into the resins, such as carboxylate or sulfonate groups neutralized with, e.g., alkali metal, alkaline earth metal or ammonium ions or quaternary nitrogen atoms.

In addition to the carboxylate or sulphonate groups present for the dispersion step the resin dispersions A) used in the coating compositions according to the invention usually contain hydroxyl or amino functional groups. In exceptional cases it is also possible to use non-functional dispersions only containing carboxylate or sulphonate groups as the binder component A).

Preferred hydroxy-functional resin dispersions are those which have a content of hydroxyl groups, based on resin solids, of 0.5 to 7.0 wt. %, preferably 0.5 to 6.0 wt. % and more preferably 1.0 to 5.0 wt. %, and acid numbers of less than 60 mg KOH/g, preferably less than 50 mg KOH/g and more preferably less than 30 mg KOH/g.

Resin component B) is selected from water dispersible polyisocyanate mixtures having low monomer contents, an average isocyanate functionality of at least 2.0, a content of aliphatically, cycloaliphatically, araliphatically and/or aromatically bound isocyanate groups (calculated as NCO; molecular weight=42) of 5.0 to 25.0 wt. % and a content of ethylene oxide units bound within polyether chains (calculated as $C_2H_4O$; molecular weight=44) of 2 to 50 wt. %. The polyether chains containing an average of 5 to 35 ethylene oxide units and at least 60 mole % of the polyether chains are connected via allophanate groups to two polyisocyanate molecules which are each prepared from at least two diisocyanate molecules.

Starting polyisocyanates for the preparation of hardener component B) include polyisocyanates which are built up from at least two diisocyanate molecules and are prepared from monomeric aliphatic, cycloaliphatic, araliphatic and/or aromatic diisocyanates. Preferred polyisocyanates are the known lacquer polyisocyanates containing uretdione, isocyanurate, allophanate, biuret, iminooxadiazinedione and/or oxadiazinetrione groups, which are described, for example, in J. Prakt. Chem. 336 (1994) 185–200, DE-A 1,670,666, 1,954,093, 2,414,413, 2,452,532, 2,641,380, 3,700,209, 3,900,053 and 3,928,503 or EP-A 336,205, 339, 396 and 798,299.

Suitable diisocyanates for the preparation of such polyisocyanates are preferably those having a molecular weight of 140 to 400 and containing aliphatically, cycloaliphatically, araliphatically and/or aromatically bound isocyanate groups. Examples include 1,4-diisocyanatobutane, 1,6-diisocyanatohexane (HDI), 1,5-diisocyanato-2,2-dimethylpentane, 2,2,4- and 2,4,4-trimethyl-1,6-diisocyanatohexane, 1,10-diisocyanatodecane, 1,3- and 1,4-diisocyanatocyclohexane, 1-isocyanato-3,3,5-trimethyl-5-isocyanato-methylcyclohexane (isophorone-diisocyanate, IPDI), 4,4'-diisocyanato-dicyclohexylmethane, 1-isocyanato- 1-methyl-4(3)isocyanatomethyl-cyclohexane, 1,3- and 1,4-bis-(2-isocyanato-prop-2-yl)-benzene (TMXDI), 2,4- and 2,6-diisocyanatotoluene (TDI), 2,4'- and 4,4'-diisocyanatodiphenylmethane, 1,5-diisocyanatonaphthalene and mixtures thereof.

Preferred starting polyisocyanates for the preparation of hardener component B) are polyisocyanates or polyisocyanate mixtures exclusively having aliphatically and/or cycloaliphatically bound isocyanate groups. Polyisocyanates or polyisocyanate mixtures, which contain isocyanurate groups and are prepared from HDI, IPDI and/or 4,4'-diisocyanato-dicyclohexylmethane are especially preferred.

Other starting compounds for the preparation of hardener component B) are monofunctional polyalkylene oxide polyether alcohols containing an average of 5 to 35, preferably 7 to 30 ethylene oxide units per molecule. They may be obtained in known manner by the alkoxylation of suitable starter molecules (see e.g., Ullmanns Encyclopädie der technischen Chemie, 4th edition, volume 19, Verlag Chemie, Weinheim p. 31–38).

Suitable starter molecules for preparing the polyether alcohols include saturated monoalcohols such as methanol, ethanol, n-propanol, isopropanol, n-butanol, isobutanol, sec-butanol, the isomeric pentanols, hexanols, octanols and nonanols, n-decanol, n-dodecanol, n-tetradecanol, n-hexadecanol, n-octadecanol, cyclohexanol, the isomeric methylcyclo-hexanols or hydroxymethylcyclohexanes, 3-ethyl-3-hydroxymethyloxetane and tetrahydrofurfuryl alcohol; unsaturated alcohols such as allyl alcohol, 1,1-dimethylallyl alcohol and oleyl alcohol; aromatic alcohols such as phenol, the isomeric cresols and methoxyphenols; araliphatic alcohols such as benzyl alcohol, anisyl alcohol and cinnamyl alcohol; secondary monoamines such as dimethylamine, diethylamine, dipropylamine, diisopropylamine, dibutylaamine, diisobutylamine, bis-(2-ethylhexyl)-amine, N-methyl- and N-ethylcyclohexylamine and dicyclohexylamine; and heterocyclic secondary amines such as morpholine, pyrrolidine, piperidine and 1H-pyrazole.

Preferred starter molecules are saturated monoalcohols having up to 4 carbon atoms. Methanol is especially preferred as the starter molecule.

Alkylene oxides which are suitable for the alkoxylation reaction are preferably ethylene oxide and propylene oxide, which can be employed in the alkoxylation reaction in any desired sequence or also as a mixture. The polyalkylene oxide polyether alcohols are either pure polyethylene oxide polyethers or mixed polyalkylene oxide polyethers wherein at least 30 mole %, preferably at least 40 mole %, of the alkylene oxide units are ethylene oxide units.

Preferred polyalkylene oxide polyether alcohols for the preparation of hardener component B) are pure polyethylene glycol monomethyl ether alcohols which contain an average of 7 to 30, more preferably 7 to 25 ethylene oxide units.

To prepare hardener component B), the starting polyisocyanates and the polyalkylene oxide polyether alcohols are reacted with one another at temperatures of 40 to 180° C., preferably 50 to 150° C., at an NCO/OH equivalent ratio of 6:1 to 400:1, preferably 8:1 to 140:1, such that at least 60 mole %, preferably at least 80 mole %, and more preferably at least 90 mole % of the urethane groups initially formed by the NCO/OH reaction are converted to allophanate groups.

Suitable catalysts can optionally be used to accelerate the allophanatization reaction. These catalysts are known and include allophanatization catalysts, for example metal carboxylates, metal chelates and tertiary amines such as those described in GB-A 994,890; alkylating agents such as those described in U.S. Pat. No. 3,769,318; and strong acids such as those described in EP-A 000,194.

Suitable allophanatization catalysts include zinc compounds, such as zinc stearate, zinc n-octanoate, zinc ethylhexanoate, zinc naphthenate and zinc acetylacetonate; tin compounds, such as tin(II) n-octanoate, tin(II) ethylhexanoate, tin(II) laurate, dibutyltin oxide, dibutyltin dichloride, dibutyltin diacetate, dibutyltin dilaurate, dibutyltin dimaleate and dioctyltin diacetate; aluminium tri (ethylacetoacetate); iron(III) chloride; potassium octoate; manganese, cobalt and nickel compounds; strong acids, such as trifluoroacetic acid, sulfuric acid, hydrogen chloride, hydrogen bromide, phosphoric acid and perchloric acid; and mixtures thereof.

Compounds which also catalyze the trimerization of isocyanate groups to form isocyanurate groups, in addition to catalyzing the allophanatization reaction, can also be employed as allophanatization catalysts. Such catalysts are described, for example in EP-A 649,866 page 4, line 7 to page 5, line 15.

The allophanatization catalysts are employed for the preparation of hardener component B), if at all, in an amount of 0.001 to 5 wt. %, preferably 0.005 to 1 wt. %, based on the total weight of the reactants. The addition of the catalyst to the reaction mixture can take place by any desired methods. For example, it is possible to admix the catalyst either with polyisocyanate component and/or with the polyether component before the start of the actual reaction. It is equally possible to add the catalyst to the reaction mixture at any desired point in time during the urethanization reaction or, in the context of a two-stage reaction procedure, after urethanization, i.e., when the NCO content corresponds to the theoretically complete conversion of isocyanate and hydroxyl groups to urethane groups.

The course of the reaction can be monitored, e.g., by titrimetric determination of the NCO content. When the required NCO content has been reached, preferably when the molar ratio of allophanate groups to urethane groups in the reaction mixture is at least 4:1, more particularly preferably at least 9:1, the reaction is terminated. In a purely thermal reaction procedure, termination can be carried out by cooling the reaction mixture to room temperature. In the preferred use of an allophanatization catalyst, the reaction is in general terminated by the addition of suitable catalyst poisons, e.g., acid chlorides, such as benzoyl chloride or isophthaloyl dichloride.

The amounts of the starting components in the process according to the invention are chosen such that the resulting polyisocyanate mixtures satisfy requirements a) to c) by having an average NCO functionality of at least 2.0, preferably 2.3 to 9.9 and more preferably 2.8 to 5.8; b) an NCO content of 5.0 to 25.0 wt. %, preferably 6.0 to 22.5 wt. % and more preferably 8.5 to 21.5 wt. %; and c) a content of ethylene oxide units incorporated into polyether chains of 2 to 50 wt. %, preferably 5 to 40 wt. % and more preferably 7 to 25 wt. %.

The NCO functionality of hardener component B) can be determined mathematically from the nature and functionality of the starting components according to the equation $$F = \frac{\sum equiv.\,NCO - \sum(1+x)\cdot mol\,OH}{\sum\left(\frac{equiv.\,NCO}{f_{NCO}}\right) + \sum mol\,OH - \sum(1+x)\cdot mol\,OH}$$

wherein x represents the content of urethane groups converted into allophanate groups. The functionality $f_{NCO}$ of the starting polyisocyanates can be calculated from the NCO content and the molecular weight, which can be determined, for example, by gel permeation chromatography (GPC) or vapor pressure osmosis.

The preparation of hardener component B) can optionally be carried out in a suitable solvent which is inert towards isocyanate groups. Suitable solvents are the known coating solvents and include ethyl acetate, butyl acetate, ethylene glycol monomethyl or -ethyl ether-acetate, 1-methoxypropyl 2-acetate, acetone, 2-butanone, methyl isobutyl ketone, 4-methyl-2-pentanone, cyclohexanone, toluene, xylene, chlorobenzene, white spirit, more highly substituted aromatics (such as those commercially available under the tradenames Solvent naphtha, Solvesso, Shellsol, Isopar, Nappar and Diasol), carbonic acid esters (such as dimethyl carbonate, diethyl carbonate, 1,2-ethylene carbonate and 1,2-propylene carbonate), lactones (such as β-propiolactone, γ-butyro-lactone, ε-caprolactone and ε-methylcaprolactone), propylene glycol diacetate, diethylene glycol dimethyl ether, dipropylene glycol dimethyl ether, diethylene glycol ethyl and butyl ether-acetate, N-methylpyrrolidone, N-methylcaprolactam and mixtures thereof.

Hardener components B) are clear, practically colorless polyisocyanate mixtures which can be dispersed easily in water by mere stirring and without using high shear forces. A considerably lower total content of ethylene oxide units is required to obtain sedimentation-stable aqueous dispersions of a given composition and molecular weight distribution of the polyether segments than in the case of prior art water dispersible polyisocyanate mixtures which have been prepared by urethanization with polyether alcohols of the same composition and molecular weight distribution. Compared with the prior art polyisocyanate mixtures containing polyether-urethanes, hardener components B) are distinguished by higher isocyanate functionalities, coupled with the same or even better dispersibility in water and comparable or even higher isocyanate contents.

Non-hydrophilically modified polyisocyanates, in particular the previously mentioned lacquer polyisocyanates, can optionally be added to the polyisocyanate mixtures B) before emulsification. The amounts added are preferably chosen such that the resulting polyisocyanate mixtures satisfy requirements a) to c) and are thus also polyisocyanate mixtures according to the invention. The use of these mixtures is possible since the polyisocyanates according to the invention generally are made up of mixtures of (i) polyisocyanates modified hydrophilically according to the invention and (ii) non-modified polyisocyanates starting materials.

In these mixtures, the process products according to the invention assume the function of an emulsifier for the subsequently admixed content of non-hydrophilic polyisocyanates.

Hardener component B), which is optionally present as a solution in an inert solvent, preferably has a viscosity at 23° C. of 50 to 10,000, preferably 50 to 2,000 mPa.s (D=40). The maximum amount of solvent in the hardener component is such that not more than 20 wt. %, preferably not more than 10 wt. %, of organic solvents are present in the resulting aqueous coating compositions according to the invention, wherein these percentages are based on the resin solids. Any solvent already contained in resin dispersions A) is included in the calculation. Suitable solvents include the known lacquer solvents, such as those previously set forth for the preparation of hardener component B).

To prepare the aqueous coating compositions, hardener component B) is emulsified in aqueous resin component A). In this procedure, resin dispersion A) and hardener component B) are combined with one another in amounts such that 0.1 to 3, preferably 0.5 to 2.0 and more preferably 0.7 to 1.7 isocyanate groups of component B) are present for each hydroxyl or amino group of component A). If non-functional resin dispersions, i.e., those which do not contain isocyanate-reactive groups, are used, the hardener component is preferably employed in amounts of up to 30 wt. %, more preferably up to 15 wt. %, based on the total amount of resin dispersion A) and hardener component B).

Before the addition of component B), the known additives from coating technology can be incorporated into component A) or B), preferably A). These include defoamers, thickeners, flow aids, pigments, emulsifiers, dispersing agents and solvents. The desired processing viscosity may be obtained by the addition of water.

Compared with the prior art polyisocyanates, hardener component B) can be emulsified particularly easily into the aqueous resin dispersion A). In most cases, simple emulsifying techniques, e.g., a mechanical stirrer, or often simple manual mixing of the two components, is sufficient to achieve coatings with very good properties. However, mixing techniques with a higher shear energy, such as jet dispersion (Farbe & Lack 102/3, 1996, p. 88–100) can also be employed.

The coating compositions according to the invention are suitable for all fields of use where coatings with an increased property profile are used, such as for coating mineral building materials, road surfaces, wood and timber materials, metallic surfaces, plastics, glass or paper, and also for gluing various materials. They can be employed in particular as primers, fillers, pigmented top coats and clear top coats in the field of automotive refinish and original equipment manufacture. The coating compositions are particularly suitable for uses where a particularly high application reliability, resistance to outdoor weathering, visual properties and resistance to solvents, chemicals and water are required, such as in automotive refinish and original equipment manufacture.

The coating compositions according to the invention can be applied by the most various spraying processes, such as compressed air, airless or electrostatic spraying processes, using one- or two-component spraying units, and also by brushing, rolling, pouring or knife-coating.

The coatings are generally dried and cured under normal temperature conditions, i.e., without heating the coating. However, the coating compositions according to the invention can also be used for the production of coatings which, after application, are dried and cured at elevated temperature, e.g., at 40 to 250° C., preferably 40 to 150° C., and more preferably 40 to 100° C.

Because of the outstanding dispersibility of the new polyisocyanate mixtures employed as hardener components B) at low ethylene oxide contents, in combination with high NCO contents and functionalities, the aqueous two-component coating compositions according to the invention can be used to prepare transparent, high-gloss and highly crosslinked coatings. In addition to a very good resistance to solvents and chemicals, these coatings have excellent resistance to water due to the comparatively low content of hydrophilic groups.

EXAMPLES

In the following examples, all parts and percentages are by weight. The viscosities were determined with the aid of a ball-and-plate viscometer in accordance with DIN 53019 at D=40 and 23° C.

Preparation of the hydroxy-functional resin dispersions A)
Preparation of aqueous primary dispersions Part I was initially introduced under $N_2$ into a 6 liter reaction vessel equipped with a stirrer, 2 dropping funnels and thermometer and was heated to 80° C. Part II and part III were then added dropwise over a period of 15 minutes, starting simultaneously, such that the reaction temperature was kept constant. The mixture was then subsequently stirred at 80° C. for 30 minutes. Parts IV and V were then added dropwise within 1.5 hours, starting simultaneously, while the reaction temperature of 80° C. was kept constant. The mixture was then subsequently stirred at 80° C. for 1 hour. Thereafter, part VI was metered in within 5 minutes, and the mixture was then stirred at 80° C. for a further 1.5 hours. The mixture was then cooled to room temperature and brought to a pH of 7.5 to 8.0 with ammonia. The compositions and properties products A1 and A2 are set forth in Table 1. The amounts are set forth in grams.

| Composition | A1 | A2 |
| --- | --- | --- |
| Part I | | |
| Emulsifier 951 (commercial product from Bayer AG) | 33.6 | 33.6 |
| Water | 1624.0 | 1624.0 |
| Part II | | |
| Methyl methacrylate | 78.6 | 73.6 |
| n-Butyl acrylate | 44.8 | 43.4 |
| Hydroxypropyl methacrylate | 35.4 | 42.6 |
| Acrylic acid | 5.0 | 5.0 |
| Part III | | |
| Ammonium peroxodisulfate | 0.7 | 0.7 |
| Water | 116.0 | 116.0 |
| Part IV | | |
| Methyl methacrylate | 707.8 | 662.4 |
| Butyl acrylate | 403.6 | 385.2 |
| Hydroxypropyl methacrylate | 318.9 | 383.0 |
| Acrylic acid | 45.4 | 45.4 |
| Part V | | |
| Ammonium peroxodisulfate | 4.8 | 4.8 |
| Water | 464.0 | 464.0 |

-continued

| Composition | A1 | A2 |
|---|---|---|
| Part VI | | |
| Ammonium peroxodisulfate | 1.4 | 1.4 |
| Water | 116.0 | 116.0 |
| Total amount | 4000.0 | 4001.1 |
| Ammonia, 25% in water | 35.0 | 36.3 |
| Properties | | |
| Solids content | 43.0% | 41.3% |
| PH | 7.7 | 7.7 |
| OH content, (resin solids, calculated) | 2.5% | 3.0% |

Preparation of hardener component B)
Hardener component B1)

860 g (4.75 eq) of a polyisocyanate, which contained isocyanurate groups, was prepared from HDI and had an NCO content of 23.2%, an average NCO functionality of 3.2 (according to GPC), a content of monomeric HDI of 0.2% and a viscosity of 1,200 mPa.s (23° C.), were initially introduced into a reaction vessel at 100° C. under dry nitrogen and while stirring. 140 g (0.28 eq) of a monofunctional polyethylene oxide polyether started on methanol and having a number average molecular weight of 500, which corresponded to an NCO/OH equivalent ratio of 18.5:1, were added within 30 min and stirring was then continued at this temperature until the NCO content of the mixture had fallen, after about 2 h, to a value of 18.8%, which corresponded to complete urethanization. The allophanatization reaction was initiated by the addition of 0.01 g of zinc(II) 2-ethyl-1-hexanoate. During the addition, the temperature of the reaction mixture rose to 109° C. due to the heat of reaction. After the exothermic reaction had subsided, about 20 min after addition of the catalyst, the reaction was terminated by the addition of 0.01 g of benzoyl chloride and the reaction mixture was cooled to room temperature. A colorless, clear polyisocyanate mixture was obtained having the following properties:
Solids content: 100%
NCO content: 17.6%
NCO functionality: 3.5
Viscosity (23° C.): 1,400 mPa.s
Ethylene oxide content: 13.1%
Degree of allophanatization: 100%
Hardener component B2)

880 g (4.86 eq) of the polyisocyanate described in example 1, which contained isocyanurate groups and was prepared from HDI, were initially introduced into a reaction vessel at 100° C. under dry nitrogen and while stirring. 120 g (0.24 eq) of a monofunctional polyethylene oxide polyether started on methanol and having a number average molecular weight of 500, which corresponded to an NCO/OH equivalent ratio of 20.3:1, were added within 30 min and stirring was then continued at this temperature until the NCO content of the mixture had fallen, after about 2 h, to a value of 19.4%, which corresponded to complete urethanization. The allophanatization reaction was initiated by the addition of 0.01 g of zinc(II) 2-ethyl-1-hexanoate. During the addition, the temperature of the reaction mixture rose to 109° C. due to the heat of reaction. After the exothermic reaction has subsided, about 20 min after addition of the catalyst, the reaction was terminated by the addition of 0.01 g of benzoyl chloride and the reaction mixture was cooled to room temperature. A colorless, clear polyisocyanate mixture was obtained having the following properties:
Solids content: 100%
NCO content: 18.5%
NCO functionality: 3.4
Viscosity (23° C.): 1,300 mPa.s
Ethylene oxide content: 11.2%
Degree of allophanatization: 90%
Comparison polyisocyanate VI (comparison with U.S. Pat. No. 5,200,489)

860 g (4.75 eq) of the polyisocyanate described in example 1, which contained isocyanurate groups and was prepared from HDI, were initially introduced into a reaction vessel at 100° C. under dry nitrogen and while stirring. 140 g (0.28 eq) of the polyether alcohol described in example 1 were added within 30 min and stirring was continued at this temperature until the NCO content of the mixture had fallen, after about 2 h, to a value of 18.8%, which corresponded to complete urethanization. After cooling to room temperature, a colorless, clear polyisocyanate mixture was obtained having the following properties:
Solids content: 100%
NCO content: 18.8%
NCO functionality: 3.0
Viscosity (23° C.) 1,300 mPa.s
Ethylene oxide content: 13.1%
Degree of allophanatization: 0%
Use examples The following examples demonstrate the performance of the coating compositions according to the invention in comparison with prior art coating compositions. The performance of the coating compositions according to the invention in fillers for automotive refinish and original equipment manufacture is shown first.

| | Weight in g |
|---|---|
| Filler 1 (according to the invention) | |
| Component 1 | |
| Resin dispersion A1 | 474.4 |
| Foamaster TCX, defoamer, 100%, Henkel | 2.2 |
| Surfynol 104, wetting agent, delivery form 100%, diluted to 50% with butyl glycol, Air Products | 8.3 |
| Corrosion inhibitor L1, 100%, Erbslöh Krefeld | 2.8 |
| Titanium dioxide, R-KB 4, Bayer AG | 79.3 |
| Aerosil R 972, Bayer AG | 9.0 |
| Talc AT 1, Norwegian Talc Deutschland GmbH | 70.8 |
| Quartz flour F 500, Quarzwerke GmbH Köln-Frechen | 28.2 |
| China-Clay B, filler, Chemie-Mineralien KG Bremen | 85.0 |
| Blanc fixe M, filler, Sachtleben Chemie GmbH Duisburg | 113.4 |
| Water, deionized | 120.0 |
| Component 2 | |
| Hardener component B1, 80% in dipropylene glycol dimethyl ether | 91.1 |
| Total amount | 1084.5 |
| Filler 2 (according to the invention) | |
| Component 1 | |
| Resin dispersion A1 | 474.4 |
| Foamaster TCX, defoamer, 100%, Henkel | 2.2 |
| Surfynol 104, wetting agent, delivery form 100%, diluted to 50% with butyl glycol, Air Products | 8.2 |
| Corrosion inhibitor L1, 100%, Erbslöh, Krefeld | 2.8 |
| Titanium dioxide, R-KB 4, Bayer AG | 78.3 |
| Aerosil R 972, Bayer AG | 9.0 |
| Talc AT 1, Norwegian Talc Deutschland GmbH | 70.0 |
| Quartz flour F 500, Quarzwerke GmbH Köln-Frechen | 28.0 |
| China-Clay B, filler, Chemie-Mineralien KG Bremen | 84.0 |
| Blanc fixe M, filler, Sachtleben Chemie GmbH Duisburg | 112.1 |
| Water, deionized | 120.0 |

| | Weight in g |
|---|---|
| Component 2 | |
| Hardener component B2, 80% in dipropylene glycol dimethyl ether | 87.0 |
| Total amount | 1076.0 |
| Filler 3 (comparison example no. 1, not according to the invention) | |
| Component 1 | |
| Resin dispersion A 1 | 474.4 |
| Foamaster TCK, defoamer, 100%, Henkel | 2.7 |
| Surfynol 104, wetting agent, delivery form 100%, diluted to 50% with butyl glycol, Air Products | 8.2 |
| Corrosion inhibitor L1, 100%, Erbslöh Krefeld | 2.8 |
| Titanium dioxide, R-KB 4 Bayer AG | 78.0 |
| Aerosil R 972, Bayer AG | 9.0 |
| Talc AT 1, Norwegian Talc Deutschland GmbH | 69.8 |
| Quartz flour F 500, Quarzwerke GmbH Köln-Frechen | 28.0 |
| China-Clay B, filler, Chemie-Mineralien KG Bremen | 83.8 |
| Blanc fixe M, filler, Sachtleben Chemie GmbH Duisburg | 111.7 |
| Water, deionized | 120.0 |
| Component 2 | |
| Comparison polyisocyanate V1, 80% in dipropylene glycol dimethyl ether | 85.6 |
| Total amount | 1074.0 |
| Filler 4 (according to the invention) | |
| Component 1 | |
| Resin dispersion A2 | 450.8 |
| Foamaster TCX, defoamer, 100%, Henkel | 2.3 |
| Surfynol 104, wetting agent, delivery form 100%, diluted to 50% with butyl glycol, Air Products | 8.5 |
| Corrosions inhibitor L1 100%, Erbslöh Krefeld | 2.8 |
| Titanium dioxide, R-KB 4, Bayer AG | 81.1 |
| Aerosil R 972, Bayer AG | 9.1 |
| Talc AT 1, Norwegian Talc Deutschland GmbH | 72.5 |
| Quartz flour F 500, Quarzwerke GmbH Kön-Frechen | 28.9 |
| China-Clay B, filler, Chemie-Mineralien KG Bremen | 86.9 |
| Blanc fixe M, filler, Sachtleben Chemie GmbH Duisburg | 116.0 |
| Water, deionized | 130.0 |
| Component 2 | |
| Hardener component B1, 80% in dipropylene glycol dimethyl ether | 106.2 |
| Total amount | 1095.1 |
| Filler 5 (according to the invention) | |
| Component 1 | |
| Resin dispersion A2 | 450.8 |
| Foamaster TCX, defoamer, 100%, Henkel | 2.2 |
| Surfynol 104, wetting agent, delivery form 100%, diluted to 50% with butyl glycol, Air Products | 8.4 |
| Corrosion inhibitor L1, 100%, Erbslöh Krefeld | 2.8 |
| Titanium dioxide, R-KB 4, Bayer AG | 80.1 |
| Aerosil R 972, Bayer AG | 9.1 |
| Talc AT 1, Norwegian Talc Deutschland GmbH | 71.5 |
| Quartz flour F 500, Quarzwerke GmbH Köln-Frechen | 28.6 |
| China-Clay B, filler, Chemie-Mineralien KG Bremen | 85.8 |
| Blanc fixe M, filler, Sachtleben Chemie GmbH Duisburg | 114.5 |
| Water, deionized | 130.0 |
| Component 2 | |
| Hardener component B2, 80% in dipropylene glycol dimethyl ether | 101.5 |
| Total amount | 1085.3 |
| Filler 6 (comparison example no. 2, not according to the invention) | |
| Component 1 | |
| Resin dispersion A2 | 450.8 |
| Foamaster TCX, defoamer, 100%, Henkel | 2.6 |
| Surfynol 104, wetting agent, delivery form 100%, diluted to 50% with butyl glycol, Air Products | 8.4 |
| Corrosion inhibitor L1, 100%, Erbslöh Krefeld | 2.8 |
| Titanium dioxide, R-KB 4, Bayer AG | 79.8 |
| Aerosil R 972, Bayer AG | 9.1 |
| Talc AT 1, Norwegian Talc Deutschland GmbH | 71.3 |
| Quartz flour F 500, Quarzwerke GmbH Köln-Frechen | 28.4 |
| China-Clay B, filler, Chemie-Mineralien KG Bremen | 85.5 |
| Blanc fixe M, filler, Sachtleben Chemie GmbH Duisburg | 114.0 |
| Water, deionized | 130.0 |
| Component 2 | |
| Comparison polyisocyanate VI, 80% in dipropylene glycol dimethyl ether | 100.3 |
| Total amount | 1083.0 |

Preparation of the fillers

The resin dispersions, additives and fillers were homogeneously mixed with a stirrer (about 1,000 rpm), and then triturated in a commercially available bead mill for 30 minutes and brought to a viscosity of 15 seconds (DIN 6 mm cup, 23° C.) with water (component 1). Component 2 (the polyisocyanate) was then added, while stirring (about 800 rpm), and mixed in homogeneously.

After preparation Filler 1 had a solids content of 58.3 wt. % and a pH of 7.8; filler 2 had a solids content of 58.3 wt. % and a pH of 7.9; filler 3 had a solids content of 58.3 wt. % and a pH of 7.8; filler 4 had a solids content of 58.9% and a pH of 7.7; filler 5 had a solids content of 58.6% and a pH of 7.8; and filler 6 had a solids content of 59.0% and a pH of 7.7.

To test the stability of the viscosity over a period of at least 2 hours, the fillers were adjusted to a flow time of 36 s (DIN 53 211, 4 mm nozzle, 23° C.) and the flow time was determined hourly.

The two-component polyurethane (2K PU) fillers were applied with a commercially available spray gun directly to degreased, ground steel sheets (15×30 cm) at a coating thickness of about 60 μm. A coating thickness wedge was applied to a second ground aluminium sheet 40×40 cm in size to determine the blister limit and the resistance to solvents. The blister limit of fillers 3 and 6 was about 100 μm, while that of fillers 1, 2, 4 and 5 was about 120 μm.

After application to the substrate, the sheets were first dried at room temperature for 30 minutes and then at 60° C. for 30 minutes, and subsequently cooled to room temperature. Thereafter, both the dry grindability (320 grade abrasive paper) and the wet grindability (800 grade abrasive paper) were good for fillers 3 and 6 and very good for fillers 1, 2, 4 and 5.

The sheets were then masked on half a side with paper, and the non-masked area was coated with a solvent-containing, black-pigmented, commercially available 2K PU top coat based on a polyacrylate polyol and an aliphatic polyisocyanate (Permacron Autolack Series 257/MS hardener plus 3030, Spiess-Hecker) (coating thickness about 60 μm). Blisters and craters are easily visible on this black top coat. The top coat was dried in a manner similar to the filler by drying at room temperature for 30 minutes and then at 60° C. for 30 minutes. After storage at room temperature for 2 hours, the Konig pendulum damping (DIN 53 157) was determined. After storage at room temperature for a further 3 days the resistance of the fillers to water and various solvents was tested by contact with an impregnated cotton-wool pad.

The coated steel sheets were additionally subjected to a special exposure to moisture at 100% atmospheric humidity and a temperature of 40° C. (condensation water test, DIN EN ISO 2409). For this, the sheet was masked on the reverse and at the edges for corrosion protection. In addition, a portion of the sheet coated only with the filler and a portion of the sheet coated with filler and top coat were masked with a colorless adhesive tape. This region was thus protected against the action of water, and served as a reference for the later evaluation. The sheets were exposed to the damp atmosphere at 40° C. for 72 hours and then evaluated. For this, the colorless adhesive tape was removed and both the filler and the top coat of the exposed and non-exposed areas were compared visually. The adhesive strength of the filler and top coat were also tested (cross-hatch). The test results are set forth in the following table.

| Filler no. | 1 | 2 | 3 (com.) | 4 | 5 | 6 (com.) |
|---|---|---|---|---|---|---|
| Viscosity: flow time in s immediately (DIN 4 mm cup) | 32 | 28 | 29 | 35 | 32 | 29 |
| after 60 min | 28 | 30 | 40 | 47 | 45 | 68 |
| after 120 min | 46 | 45 | 95 | 56 | 54 | 118 |
| König pendulum damping, s (after 30 min 60° C. + 2 h RT) | 83 | 84 | 77 | 87 | 91 | 85 |
| Resistance after 30 min 60° C. + 3 d RT[1] exposure: | | | | | | |
| 30 min water | 0 | 0 | 4 | 0 | 0 | 3 |
| 1 min isopropanol/water 1:1 | 0 | 0 | 1 | 0 | 0 | 1 |
| 1 min butyl glycol | 0 | 0 | 2 | 0 | 0 | 1 |
| 1 min MPA/xylene 1:1 | 1 | 0 | 3 | 0 | 0 | 2 |
| Condensation water test (72 h, 40° C.)[2] | | | | | | |
| Adhesion: filler / filler + top coat | 1/1 | 1/1 | 3/4 | 0/1 | 0/1 | 2/3 |
| Blistering: filler / filler + top coat | 0/1 | 0/1 | 3/4 | 0/0 | 0/0 | 3/3 |

[1]: 0 = best value (no change), 5 = worst value (marked dissolution)
[2]: 0 = best value (no change), 5 = worst value (marked loss of adhesion or very severe blistering)

Discussion of the results:

Fillers 1, 2, 4 and 5 formulated according to the invention had a better viscosity stability and resistance to solvents compared with fillers 3 and 6. The hardness, grindability and blister limit of fillers 1 to 6 were comparably good. Clear advantages additionally resulted for fillers 1, 2, 4 and 5 in the three-day exposure to moisture at 40° C. Practically no differences were seen between the non-exposed, masked surface and the exposed surface either in the filler or in the top coat. To the contrary, the adhesion in the case of fillers 3 and 6 was significantly poorer in the exposed region than in the non-exposed masked region. Also, the exposed region of fillers 3 and 6 showed a large number of small blisters, in contrast to the non-exposed region (no blisters).

2K PU clear varnishes

The following clear varnish examples were experiments in which the dispersibility of the polyisocyanates B) employed in the coating compositions according to the invention was compared with the dispersibility of polyisocyanates of the prior art, and the effects on the transparency of the films was illustrated.

In addition to resin dispersions A1 and A2 described above, a water dilutable polyacrylate dispersion A3, which was based on methyl methacrylate, hydroxyethyl methacrylate, butyl acrylate, acrylic acid, di-tert-butyl peroxide as initiator, and dimethylethanolamine as neutralizing agent, was used as the water dilutable resin component. The solids content was about 45 wt. % in an 85/7.5/7.5 mixture of water, Solvent naphtha 100 solvent and 2-butoxyethanol; the OH content was about 3.3 wt. % (based on resin solids); the acid number was about 25 mg KOH/g (based on resin solids) and the pH was about 8.0.

Polyisocyanates B1 and B2 and comparison polyisocyanate V1 were used as the hardener component. An NCO/OH equivalent ratio of 1.1:1 was maintained.

| | Weight in g |
|---|---|
| Clear varnish 1 (according to the invention) | |
| Component 1 | |
| Resin dispersion A1 | 50.0 |
| Component 2 | |
| Hardener component B1, 80% in dipropylene glycol dimethy ether | 10.4 |
| Total amount | 60.4 |
| Clear varnish 2 (according to the invention) | |
| Component 1 | |
| Resin dispersion A2 | 50.0 |
| Component 2 | |
| Hardener component B2, 80% in dipropylene glycol dimethyl ether | 11.4 |
| Total amount | 61.4 |
| Clear varnish 3 (comparison example no. 3, not according to the invention) | |
| Component 1 | |
| Resin dispersion A1 | 50.0 |
| Component 2 | |
| Comparison polyisocyanate V1, 80% in dipropylene glycol dimethy ether | 9.7 |
| Total amount | 59.7 |
| Clear varnish 4 (comparison example no. 4, not according to the invention) | |
| Component 1 | |
| Resin dispersion A2 | 50.0 |
| Component 2 | |
| Comparison polyisocyanate V1, 80% in dipropylene glycol dimethyl ether | 11.2 |
| Total amount | 61.2 |
| Clear varnish 5 (according to the invention) | |
| Component 1 | |
| Resin dispersion A3 | 50.0 |
| Component 2 | |
| Polyisocyanate B1, 80% in dipropylene glycol dimethy ether | 14.3 |
| Total amount | 64.3 |

Preparation of clear coatings

The polyisocyanate hardener (component 2) was added to component 1 with slow stirring (400 rpm), which was intended to simulate manual thorough mixing, and the components were mixed for 2 min. The mixture was brought to a processing viscosity of about 25 seconds (DIN 4 mm cup, 23° C.) with water. The aqueous 2K PU clear varnishes were drawn onto glass plates with the aid of a film caster (wet film thickness 120 μm). The plates were then dried at room temperature (RT) and (force) dried at 60° C. for 30 minutes. After 24 hours the Konig pendulum damping (DIN 53 157) was measured, the resistance to water and various solvents was determined and the film transparency was evaluated visually. The test results are set forth in the following table.

| Test | Clear varnish no.: | 1 | 2 | 3 (com.) | 4 (com.) | 5 |
| --- | --- | --- | --- | --- | --- | --- |
| König pendulum damping, s | RT | 53 | 60 | 58 | 64 | 49 |
| | forced | 93 | 106 | 109 | 112 | 88 |
| Film transparency | | clear | clear | cloudy | cloudy | clear |
| Resistance to water[1] | RT | 0 | 0 | 5 | 5 | 0 |
| contact for 30 min | forced | 0 | 0 | 3 | 3 | 0 |
| Isopropanol/water[1] | RT | 0 | 0 | 3 | 2 | 0 |
| contact for 5 min | forced | 0 | 0 | 1 | 1 | 0 |
| MPA/xylene (1:1)[1] | RT | 0 | 0 | 2 | 1 | 0 |
| contact for 5 min | forced | 0 | 0 | 0 | 0 | 0 |
| Butyl glycol[1] | RT | 0 | 0 | 2 | 1 | 0 |
| contact for 5 min | forced | 0 | 0 | 1 | 0 | 0 |

[1] 0 = best value (no finding), 5 = worst value (varnish film completely detached)

Discussion of the results:

Clear coatings 1, 2 and 5 prepared according to the invention were absolutely transparent, while clear varnishes 3 and 4 were cloudy. It is apparent from these results that the polyisocyanates used in coatings 1, 2 and 5 according to the invention can be emulsified considerably better and more homogeneously into the aqueous phase. As a result, clear coatings having higher gloss and lower haze can be prepared with the coating compositions according to the invention than can be prepared with the prior art coating compositions. It is also apparent from these results that the resistance of clear coatings 1, 2 and 5 to water and solvents was substantially better than that for comparison clear coatings 3 and 4.

Although the invention has been described in detail in the foregoing for the purpose of illustration, it is to be understood that such detail was solely for that purpose and that variations can be made therein by those skilled in the art without departing from the spirit and scope of the invention except as it may be limited by the claims.

What is claimed is:

1. A coating composition comprising
   A) 30 to 99 wt. % of an aqueous hydroxy- and/or amino-functional resin dispersion and
   B) 1 to 70 wt. % of a water dispersible polyisocyanate mixture prepared from aliphatic, cycloaliphatic, araliphatic and/or aromatic diisocyanates and having
      a) an average isocyanate functionality of at least 2.0,
      b) a content of 5.0 to 25.0 wt. %, based on resin solids, of isocyanate groups (calculated as NCO; molecular weight=42) and
      c) a content of 2 to 50 wt. %, based on resin solids, of ethylene oxide units calculated as $C_2H_4O$; molecular weight 44) incorporated within polyether chains containing an average of 5 to 35 ethylene oxide units, wherein at least 60 mole % of the polyether chains are connected via allophanate groups to two polyisocyanate molecules which are each prepared from at least two diisocyanate molecules.

2. The coating composition of claim 1 wherein said polyisocyanate mixture is prepared from an aliphatic and/or cycloaliphatic diisocyanate and has
   a) an average isocyanate functionality of 2.3 to 9.9,
   b) a content of 6.0 to 22.5 wt. %, based on resin solids, of isocyanate groups and
   c) a content of 5 to 40 wt. %, based on resin solids, of ethylene oxide units incorporated within polyether chains containing an average of 7 to 30 ethylene oxide units.

3. The coating composition of claim 1 wherein said two polyisocyanate molecules contain isocyanurate groups.

4. The coating composition of claim 1 wherein at least 80 mole % of the polyether chains are connected via allophanate groups to two polyisocyanate molecules containing isocyanurate groups, which are each prepared from at least two diisocyanate molecules containing aliphatically and/or cycloaliphatically bound isocyanate groups.

5. The coating composition of claim 1 wherein component A) comprises an aqueous resin dispersion having a content of hydroxyl group content of 0.5 to 7.0 wt. %, based on resin solids.

6. The coating composition of claim 1 wherein component A) comprises an aqueous polyacrylate resin dispersion.

7. The coating composition of claim 1 wherein component A) comprises an aqueous polyester resin dispersion.

8. The coating composition of claim 1 wherein component A) comprises an aqueous polyurethane resin dispersion.

9. The coating composition of claim 1 wherein component A) comprises an aqueous polyether or polyepoxide resin dispersion.

10. The coating composition of claim 1 wherein component A) comprises an aqueous hybrid resin dispersion comprising a member selected from the group consisting of polyester/polyacrylate resins, polyester/polyurethane resins, polyurethane/polyacrylate resins, polyether/polyacrylate resins, polyether/polyester resins and polyether/polyurethane resins.

11. The coating composition of claim 1 wherein components A) and B) are present in amounts sufficient to provide 0.1 to 3 isocyanate groups of component B) for each hydroxyl and amino group of component A).

12. The coating composition of claim 1 wherein components A) and B) are present in amounts sufficient to provide 0.5 to 2.0 isocyanate groups of component B) for each hydroxyl and amino group of component A).

13. The coating composition of claim 1 wherein components A) and B) are present in amounts sufficient to provide 0.7 to 1.7 isocyanate groups of component B) for each hydroxyl and amino group of component A).

14. A substrate coated with the coating composition of claim 1 wherein the substrate is selected from the group consisting of mineral building materials, road surfaces, wood and timber materials, metals, plastics, glass and paper.

15. A substrate coated with the coating composition of claim 1 wherein the substrate is an automotive substrate.

* * * * *